United States Patent
Bergström et al.

(10) Patent No.: US 10,963,104 B2
(45) Date of Patent: Mar. 30, 2021

(54) OPTICAL COUPLING IN TOUCH-SENSING SYSTEMS

(71) Applicant: FlatFrog Laboratories AB, Lund (SE)

(72) Inventors: Håkan Bergström, Torna Hällestad (SE); Aleksander Kocovski, Malmö (SE)

(73) Assignee: FlatFrog Laboratories AB, Lund (SE)

(*) Notice: Subject to any disclaimer, the term of this patent is extended or adjusted under 35 U.S.C. 154(b) by 0 days.

(21) Appl. No.: 16/313,820

(22) PCT Filed: Feb. 5, 2018

(86) PCT No.: PCT/EP2018/052757
§ 371 (c)(1),
(2) Date: Dec. 27, 2018

(87) PCT Pub. No.: WO2018/141948
PCT Pub. Date: Aug. 9, 2018

(65) Prior Publication Data
US 2020/0310592 A1    Oct. 1, 2020

(30) Foreign Application Priority Data
Feb. 6, 2017 (EP) .................................... 17154898

(51) Int. Cl.
*G02B 1/00* (2006.01)
*G06F 3/042* (2006.01)
(52) U.S. Cl.
CPC .......... *G06F 3/0428* (2013.01); *G06F 3/0421* (2013.01); *G06F 2203/04107* (2013.01)
(58) Field of Classification Search
CPC ...... G06F 3/0421; G06F 3/0428; G06F 3/042; G02B 27/00; G02B 6/32
See application file for complete search history.

(56) References Cited

U.S. PATENT DOCUMENTS

| | | | |
|---|---|---|---|
| 9,001,086 B1* | 4/2015 | Saini | G06F 3/0428 345/175 |
| 2013/0141395 A1* | 6/2013 | Holmgren | B60K 37/06 345/175 |
| 2013/0257810 A1 | 10/2013 | Niu et al. | |

FOREIGN PATENT DOCUMENTS

| WO | WO 2008/034184 A1 | 3/2008 |
|---|---|---|
| WO | WO 2014/086084 A1 | 6/2014 |

OTHER PUBLICATIONS

International Search Report for International App. No. PCT/EP2018/052757, dated Apr. 23, 2018, in 3 pages.

* cited by examiner

*Primary Examiner* — Michael A Faragalla
(74) *Attorney, Agent, or Firm* — Knobbe Martens Olson & Bear, LLP (57) ABSTRACT

A touch sensing apparatus is disclosed, comprising a light transmissive panel that defines a touch surface, an opposite rear surface, and panel sides extending between the touch surface and rear surface. The panel sides define a perimeter of the light transmissive panel. The touch sensing apparatus comprises a plurality of light emitters and detectors arranged along the perimeter and adjacent the panel sides, a light guide arranged along the perimeter and having a first reflective surface comprising a diffusive light scattering element. The light emitters are arranged to emit a respective beam of light onto the diffusive light scattering element so as to generate propagating light that diffusively propagates above the touch surface, wherein the light detectors are arranged to receive detection light generated as said propagating light impinges on the diffusive light scattering element, and wherein the diffusive light scattering element is arranged at least partly outside the panel sides and extending at least partly above the touch surface.

20 Claims, 10 Drawing Sheets

OPTICAL COUPLING IN TOUCH-SENSING SYSTEMS

TECHNICAL FIELD

The present invention relates to touch-sensing apparatus that operate by propagating light by diffusive light scattering above a thin light transmissive panel, and in particular to optical solutions for defining the location of the light paths.

BACKGROUND ART

In one category of touch-sensitive panels known as 'above surface optical touch systems', a set of optical emitters are arranged around the periphery of a touch surface to emit light that is reflected to travel and propagate above the touch surface. A set of light detectors are also arranged around the periphery of the touch surface to receive light from the set of emitters from above the touch surface. An object that touches the touch surface will attenuate the light on one or more propagation paths of the light and cause a change in the light received by one or more of the detectors. The location (coordinates), shape or area of the object may be determined by analysing the received light at the detectors.

Figure 1:
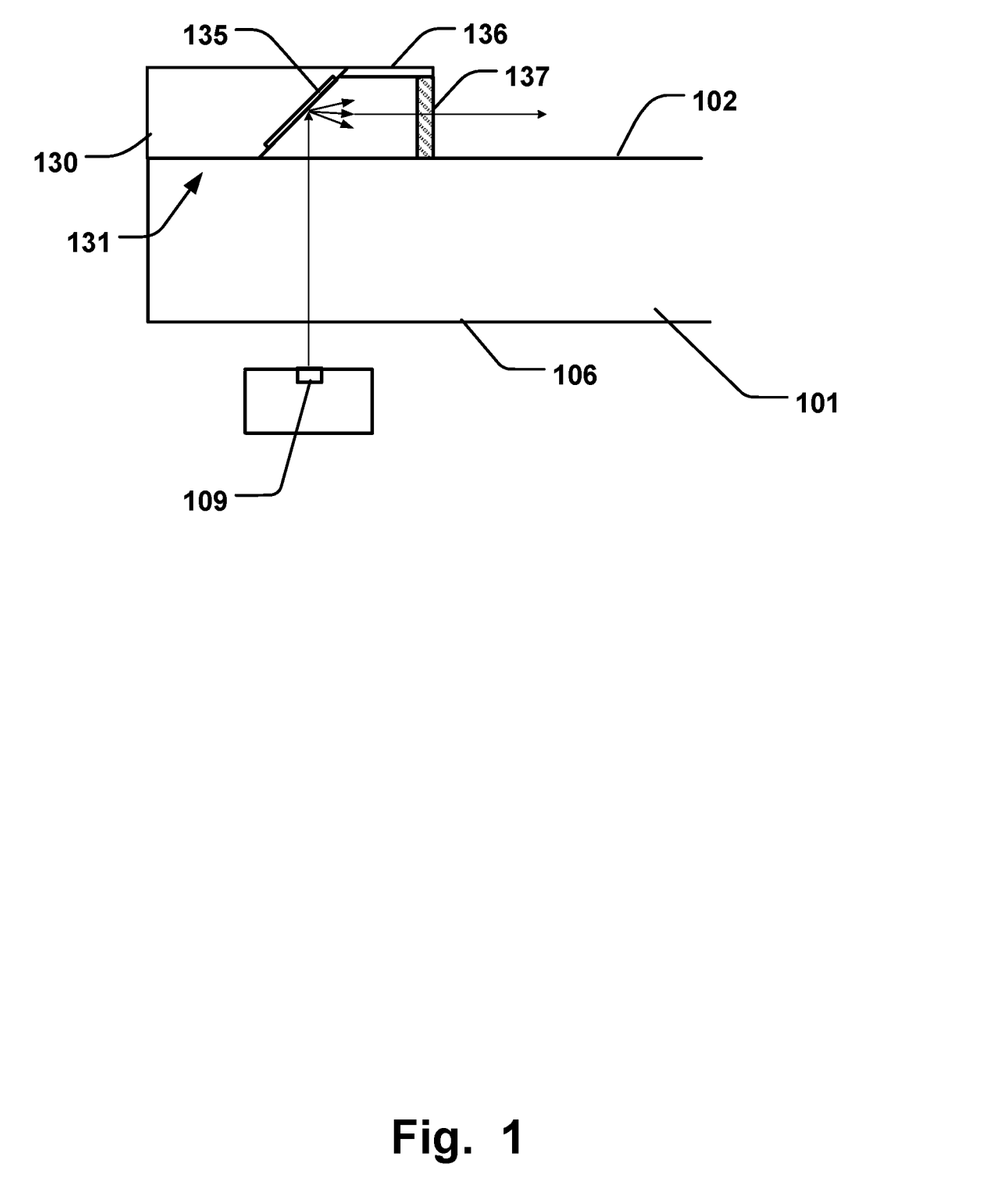
FIG. 1 is a section view of a touch-sensitive apparatus according to the prior art.

In a variant of such 'above surface optical touch system', illustrated in FIG. 1, the light from the emitters 109 propagate above the touch surface 102 of the panel via reflection or scattering on an edge reflector or diffusor 130. The light will then continue until deflected by a corresponding edge reflector at an opposing edge of the light transmissive panel, where the light will be scattered back down through the transmissive panel and onto the detectors. Thus, irrespectively of the propagation path, via FTIR or above-surface reflection, the light is initially coupled into the light transmissive panel 101, via a rear surface 106 thereof. Such solution may allow for tolerating larger variations of the properties of the edges of the panel since the edges lie in the outside periphery of the components and light paths mentioned above. However, there may be some signal loss with respect to the part of the light that is scattered to travel above the touch surface, since this light is also coupled through the panel. Furthermore, such an arrangement necessitates that the diffusor 130 overlays the edges 131 of the touch surface 102, so that area available for the touch surface is reduced and that height is added along the edges of the panel. Adding components on top of the light transmissive panel may also compromise the robustness of the system. For example, the thermal expansion coefficients of such components and the light transmissive panel may be different, causing the components to come loose from the panel as a result of temperature variations during operation of the touch system. Even a small or local detachment may cause a significant decrease in the performance of the system.

Some prior art systems rely on coupling and propagation of collimated light across the light transmissive panel. Such systems are however cumbersome to reliably implement due to the small tolerances with respect to the alignment of the components thereof. E.g. the light emitters- and detectors need to be precisely aligned in relation to various lenses and reflect the light via concave and/or convex reflection and/or refraction to get the desired collimation. Such precise alignment may be difficult to achieve in mass production. The use of collimated light, or light reflected by means of specular reflection, also adds to this complexity, which in turn results in a more expensive and less compact system. Furthermore, to reduce system cost, it may be desirable to minimize the number of electro-optical components.

SUMMARY

An objective is to at least partly overcome one or more of the above identified limitations of the prior art.

One objective is to provide a touch-sensitive apparatus based on "above-surface" light propagation which is robust and compact.

Another objective is to provide an "above-surface"-based touch-sensitive apparatus with efficient use of light.

One or more of these objectives, and other objectives that may appear from the description below, are at least partly achieved by means of touch-sensitive apparatuses according to the independent claims, embodiments thereof being defined by the dependent claims.

According to a first aspect a touch sensing apparatus is provided, comprising a light transmissive panel that defines a touch surface, an opposite rear surface, and panel sides extending between the touch surface and rear surface. The panel sides define a perimeter of the light transmissive panel. The touch sensing apparatus comprises a plurality of light emitters and detectors arranged along the perimeter and adjacent the panel sides, a light guide arranged along the perimeter and having a first reflective surface comprising a diffusive light scattering element. The light emitters are arranged to emit a respective beam of light onto the diffusive light scattering element so as to generate propagating light that diffusively propagates above the touch surface, wherein the light detectors are arranged to receive detection light generated as said propagating light impinges on the diffusive light scattering element, and wherein the diffusive light scattering element is arranged at least partly outside the panel sides and extending at least partly above the touch surface.

Some examples of the disclosure provide for a more robust touch sensing apparatus.

Some examples of the disclosure provide for a more compact touch sensing apparatus.

Some examples of the disclosure provide for a touch sensing apparatus that is easier to manufacture.

Some examples of the disclosure provide for a touch sensing apparatus that is less costly to manufacture.

Some examples of the disclosure provide for a touch sensing apparatus that is more reliable to use.

Some examples of the disclosure provide for a touch sensing apparatus with improved scalability for differently sized touch surfaces.

Some examples of the disclosure provide for a touch sensing apparatus that has a better signal-to-noise ratio of the detected light.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

These and other aspects, features and advantages of which examples of the invention are capable of will be apparent and elucidated from the following description of examples of the present invention, reference being made to the accompanying drawings, in which.

DETAILED DESCRIPTION OF EXAMPLE EMBODIMENTS

In the following, embodiments of the present invention will be presented for a specific example of a touch-sensitive apparatus. Throughout the description, the same reference numerals are used to identify corresponding elements.

FIG. 1 schematically illustrates a variant of an 'above surface optical touch system', as discussed in the Background Art section above, where the light from the emitters 109 propagate above the touch surface 102 of the panel via reflection on an edge reflector 130.

Figure 2A:
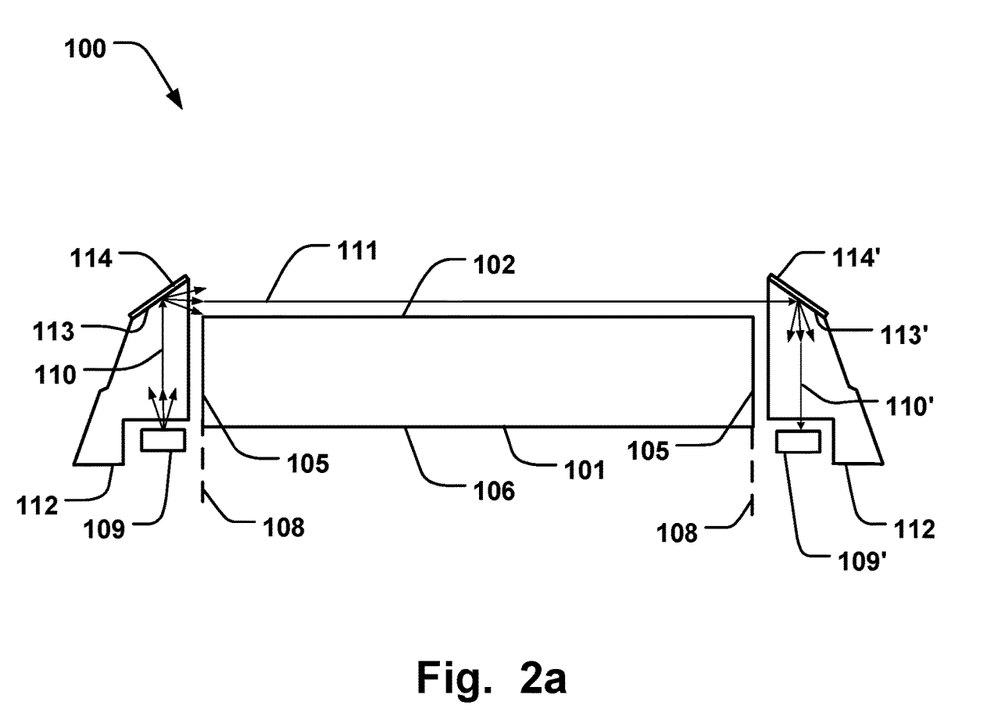
FIG. 2a is a schematic illustration, in a cross-sectional side view, of a light transmissive apparatus according to one example.
Figure 2B:
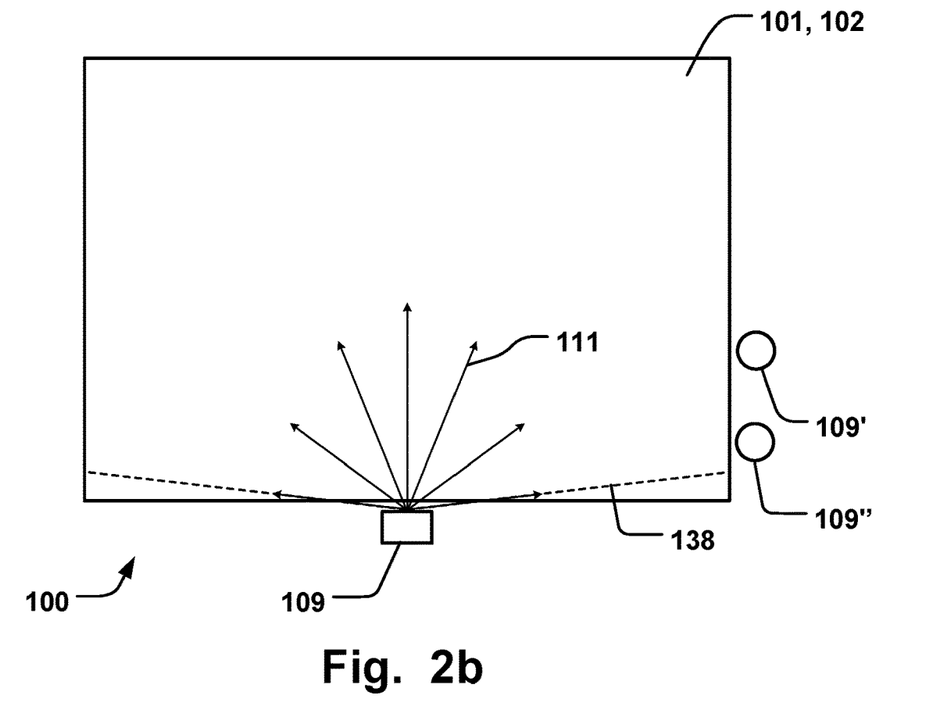
FIG. 2b is a schematic illustration, in a top-down view, of a light transmissive apparatus according to one example.
Figure 2C:
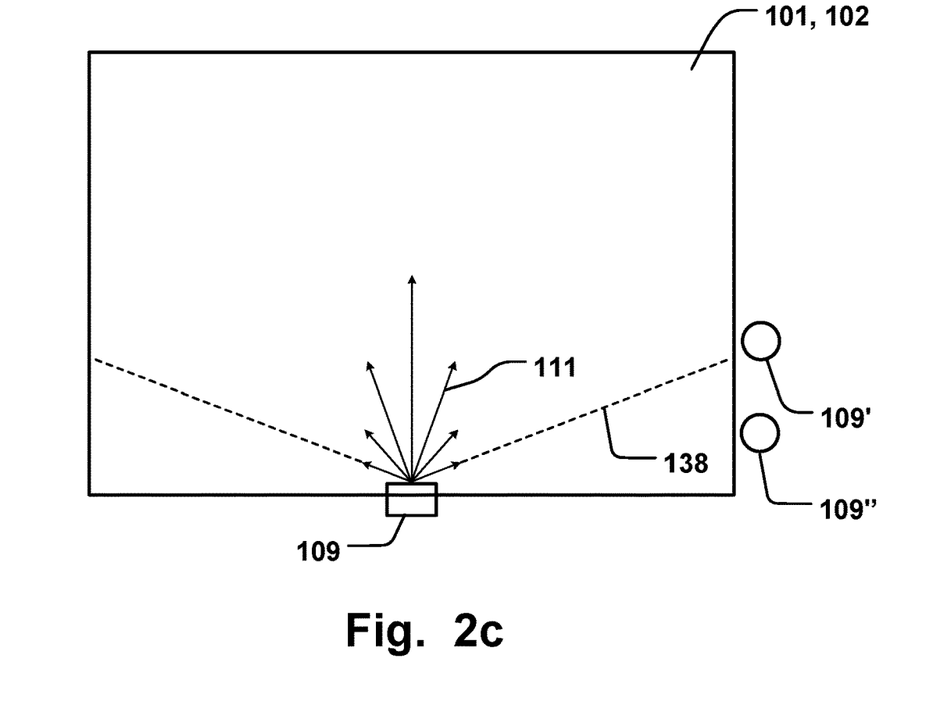
FIG. 2c is a schematic illustration, in a top-down view, of a light transmissive apparatus according to the prior art.
Figure 3:
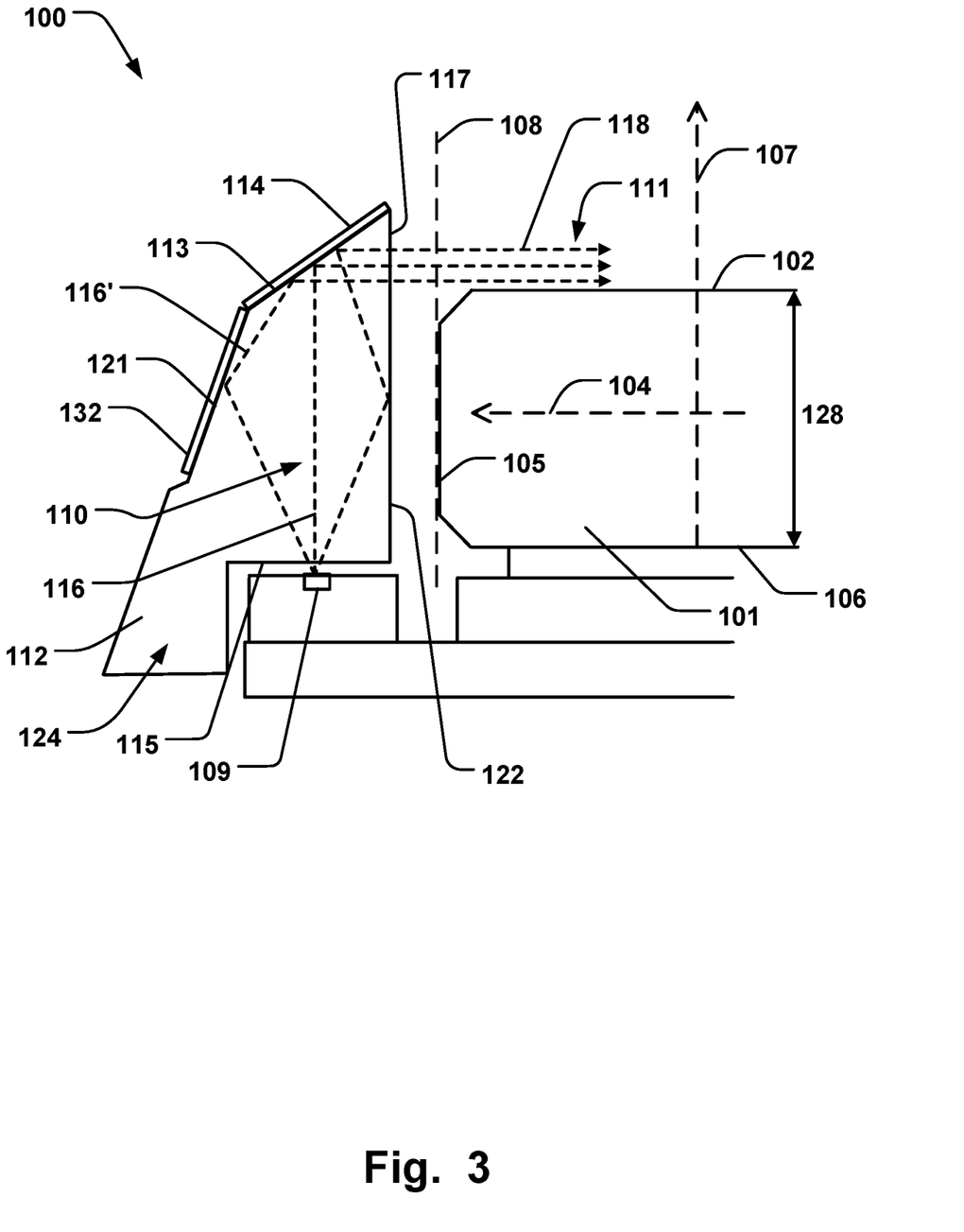
FIG. 3 is a schematic illustration, in a cross-sectional side view, of a detail of a light transmissive apparatus according to one example.
Figure 5:
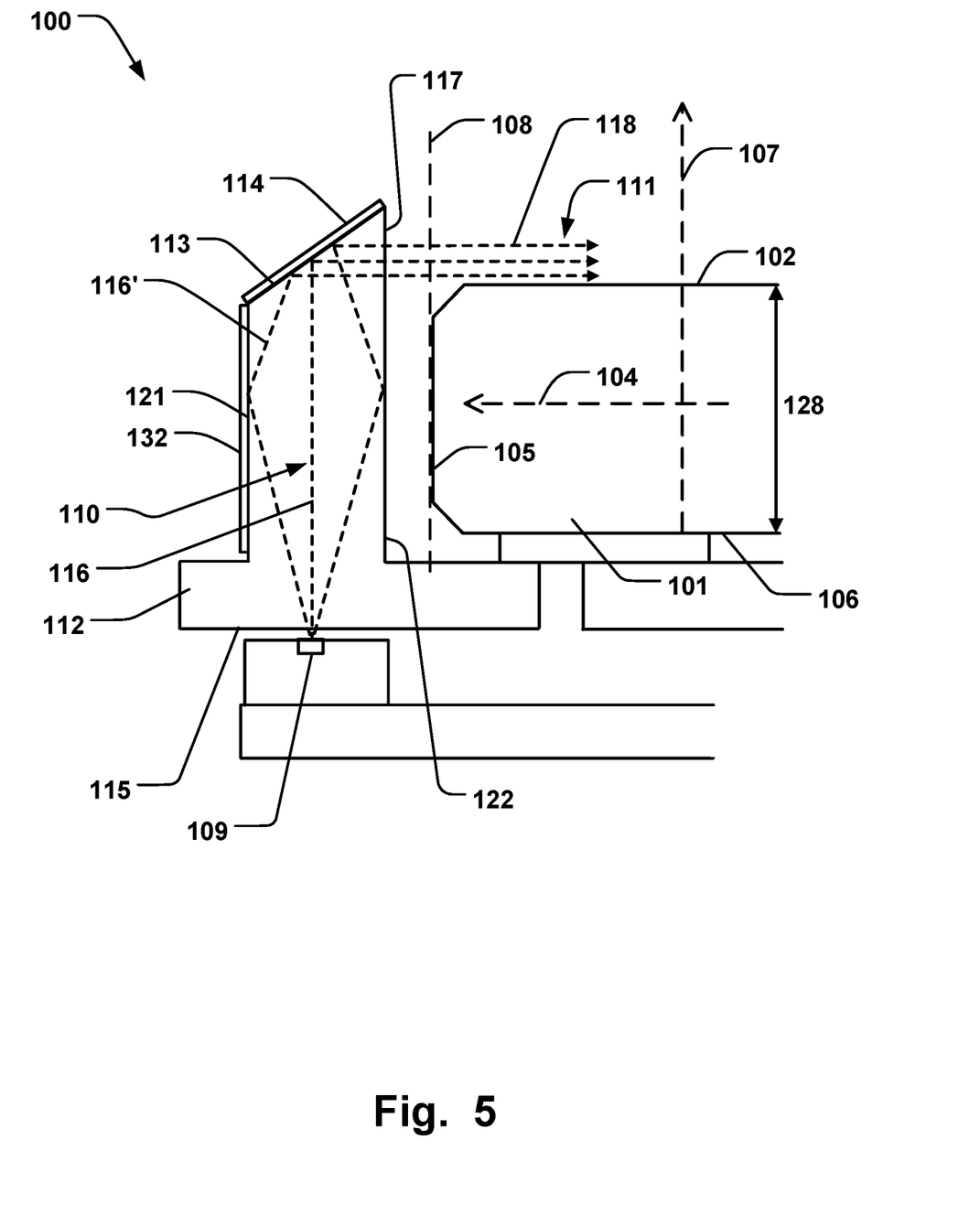
FIG. 5 is a schematic illustration, in a cross-sectional side view, of a detail of a light transmissive apparatus according to one example.

FIG. 2a schematically illustrate a touch sensing apparatus 100 comprising a light transmissive panel 101 that defines a touch surface 102, an opposite rear surface 106, and panel sides 105 extending between the touch surface 102 and the rear surface 106. Thus, the panel sides 105 define a perimeter 108 of the light transmissive panel 101. The touch sensing apparatus 100 further comprises a plurality of light emitters 109 and detectors 109' arranged along the perimeter 108 and adjacent the panel sides 105. A light guide 112 is arranged along the perimeter 108 of the light transmissive panel 101. The light guide 112 has a first reflective surface 113, 113' comprising a diffusive light scattering element 114, 114'. The light emitters 109 are arranged to emit a respective beam of light 110 onto the diffusive light scattering element 114 so as to scatter light 111 that propagates above the touch surface 102. The first reflective surface 113 is thus angled in relation to the light emitter 109 such that the beam of light 110 is diffusively scattered towards the touch surface 102. Similarly, the light detectors 109' are arranged to receive detection light 110' generated as the propagating light 111 impinges on the diffusive light scattering element 114' of the corresponding first reflective surface 113'. The first reflective surface 113' is in this case angled in relation to the touch surface 102 such that the light 111 propagating over the touch surface 102 is diffusively scattered towards the detector 109'. Each diffusive light scattering element 114' will act as a light source ("virtual light source") that diffusively emits "detection light" for receipt by the detector 109'. As schematically illustrated in FIGS. 2, 3, and 5, the diffusive light scattering element 114, 114', is arranged at least partly outside the panel sides 105, i.e. outside the perimeter 108 of the panel 105, and extending at least partly above the touch surface 102. Having the diffusive light scattering element 114, 114', arranged at least partly outside the panel sides 105, provides for optimizing of signal to noise ratio of the detected light 110' when using an "above-surface" optical touch system, since light can be guided around the edges 105 of the panel without having to pass through the panel 105. Furthermore, this simultaneously increases the benefit and efficiency of the virtual light source provided by the reflection on the first reflective surface 113 due to the diffusive light scattering element 114 thereof. I.e. a minimum of light 110 is lost from the emitter 109 before the light 110 reaches the light scattering element 114. This means that the emitter 109 is effectively moved to the position of the light scattering element 114, thereby allowing for an optimized diffusive scattering of light above and across the touch surface 102. This in turn provides for improved accuracy, usability and robustness of the touch sensing apparatus 100. Cumbersome alignment of the optical components is also avoided, since the diffusively scattering light source is effectively moved directly to the virtual- or secondary diffusive light source position, above the touch surface 102. This provides for a touch sensing apparatus that is less complex to manufacture, facilitating mass production.

FIG. 2b illustrates a top down-view of the touch sensing apparatus 100. The optimized diffusive scattering of light above and across the touch surface 102 as elucidated above provides for diffusive scattering of light 111 from the emitters 109 over a wide angle across the touch surface 102, compared to the case when the light 111 from emitter 109 needs to be transmitted through the light transmissive panel 101, which is illustrated in FIGS. 1 and 2c. A higher intensity of the light 111 can thus be maintained by means of the touch sensing apparatus 100. The length of the arrows in FIGS. 2b and 2c are proportional to the light intensity. FIG. 2b illustrate how the increased width of the light field 138 will increase the number of detectors 109', 109", that can detect the emitted light 111, thus increasing the number of detection lines and thereby the accuracy of the touch sensing apparatus 100.

The diffusor 135 illustrated in FIG. 1, must normally be protected from mechanical interaction as well as from dirt and ambient light requiring a dust shield 136 forming a physical barrier preventing the dust from reaching diffusor 135 and a transparent window 137 through which the light signal may pass unhindered. Further components such as an edge cover may also be required in these solutions. This complicates assembly and increase cost. Moreover, the sealing window 137 will introduce unwanted Fresnel reflection losses especially at high angles (φ) of the light relative the touch surface, leading to problems with complete coverage of emission from one specific side to all detectors at the three opposing sides. The Fresnel reflexes will also generate additional unwanted light paths that will reduce the apparent attenuation on some detection lines, especially when they run parallel to and near a sealing window, these Fresnel reflexes may also result in artefacts and false touch information.

Having the diffusive light scattering element 114, 114', arranged at least partly outside the panel sides 105, also free up the peripheral space around the edges of the touch surface 102, since substantially all components can be moved outside the edges 105. This also provides for a substantially flush surface across the edges 105 of the panel 101, since nothing needs to be placed on top of the touch surface 102. This will all together allow for a more compact touch sensing apparatus 100. In this regard, the fact that the diffusive light scattering element 114 provides for diffusively scattered light in an efficient manner, as elucidated above, will further contribute to reducing the complexity and increase the compactness of the touch sensing apparatus 100. Such synergy is due to the diffusive light scattering element 114 having the ability to act as a secondary light source for many different types of emitters 109 and for many different relative orientations between the emitter 109 and the diffusive light scattering element 114, as long as the light from the emitter 109 hits the diffusive light scattering element 114 with a proper extent and at a proper location. Since the diffusive light scattering element 114 more or less randomly re-distributes the incoming light, the importance of the luminance profile of the emitter 109 is reduced or even eliminated.

One or more emitters 109 may be arranged to illuminate the diffusive light scattering element 114 simultaneously, for the same detection line. This provides for further increasing the intensity of the light. Similarly, a plurality of detectors 109' may be used to detect light from a single detection line. Further, the spacing between the emitters 109 and the detectors 109' may be varied to affect the spacing of the "virtual" emitters and detectors 109, 109', at the diffusive light scattering elements 114, 114', to control the width of the detection lines, i.e. affecting the width of each individual detection line of the light field 138 in FIG. 2b. Enabling the use of "virtual" emitter- and detector pairs, thanks to the diffusive light scattering element 114 being arranged as discussed, thus allows for a highly customizable touch sensing apparatus where several emitter- and detector pairs can be added to each detection line, or overlapped, depending on e.g. the size of the touch surface 102 that is to be manufactured. This allows also improved control of the attenuation of the detection light.

With respect to the discussion above, "diffuse reflection" refers to reflection of light from a surface such that an incident ray is reflected at many angles rather than at just one angle as in "specular reflection". Thus, a diffusively reflecting element will, when illuminated, emit light by reflection over a large solid angle at each location on the element. The diffuse reflection is also known as "scattering". Accordingly, the diffusive light scattering element 114 will act as a light source ("secondary light source") to emit diffuse light. The secondary light source thereby defines the actual origin of the detection lines that are generated by the light from the respective emitter 109.

Figure 8:
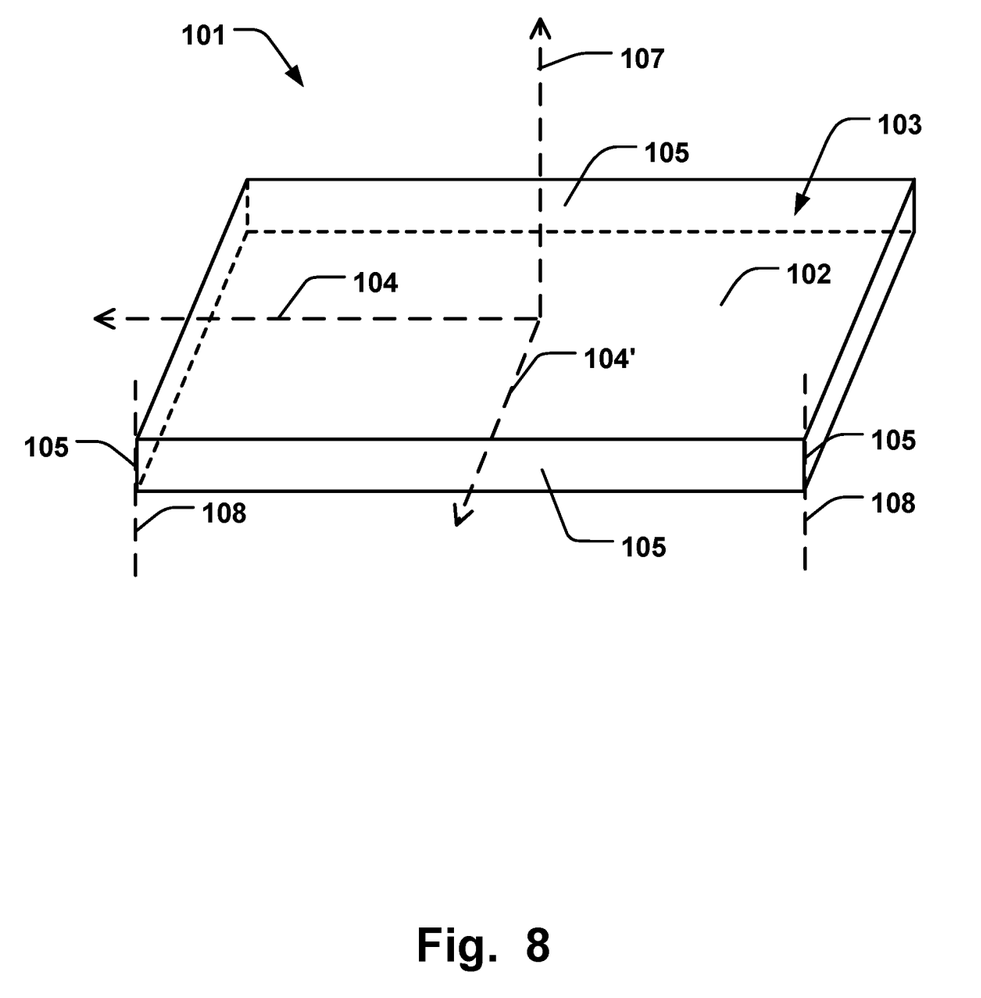
FIG. 8 is a schematic illustration, in a perspective view, of a detail of a light transmissive apparatus according to one example.

The light emitters 109 and/or the light detectors 109' may be arranged outside the panel sides 105, as shown in the examples in e.g. FIGS. 2 and 3. I.e. the light emitters 109 and/or the light detectors 109' may be arranged radially outside the perimeter 108 of the panel 101, in a radial direction 104, 104'. The radial direction 104, 104' is perpendicular to a normal axis 107 of a plane 103 in which the light transmissive panel 101 extends, as illustrated in FIG. 8. Arranging the light emitters 109 and/or the light detectors 109' outside the panel sides 105 provides for an efficient and simple coupling of the light emitted or received therefrom to the first reflective surface 113, 113', and the diffusive light scattering element 114, 114', thereof, which is also arranged outside the panel sides 105. Loss of available light is thereby minimized, and the alignment requirements are relaxed, which is beneficial for mass production.

The light emitters 109 and/or the light detectors 109' may furthermore be aligned opposite the first reflective surface 113, 113'. This will further allow for efficiently directing the emitted light 110 to the first reflective surface 113 and the diffusive light scattering element 114 thereof. This is beneficial with respect to effectively moving the light source to the "secondary" light position above the touch surface 102, as discussed above, since more of the available light may now be diffusively scattered above the touch surface 102. Light 110 emitted from the light source 109 has an intensity profile which, due to aligning the light source 109 opposite the first reflective surface 113, may have a maximum intensity along an axis that coincides with the location of the first reflective surface 113. Similarly, detector 109' may receive the maximum amount of detection light 110' when arranged opposite the first reflective surface 113'. 'Arranged opposite' may thus be construed as having the light emitters 109 and/or the light detectors 109' facing the first reflective surface 113, 113' along a direction parallel to a normal axis 107 of a plane 103 in which the light transmissive panel 101 extends. An axis along which the intensity of emitted light assumes a maximum may thus also be aligned in parallel with the normal axis 107. In other embodiments, the axis along which the intensity of emitted light assumes a maximum may be within a few degrees of normal axis 107.

Turning to FIGS. 3 and 5, the light guide 112 may comprise a first light coupling surface 115 facing the light emitters 109 and/or the light detectors 109'. The first light coupling surface 115 is arranged to direct the emitted light 110, received from the emitter 109, to the first reflective surface 113 and the diffusive light scattering element 114 thereof, and vice versa with respect to directing light to detector 109'. The extension of the first light coupling surface 115 in a radial direction 104, 104', perpendicular to a normal axis 107 of the plane 103 in which the light transmissive panel extends, may overlap at least partly with the extension of the first reflective surface 113, 113', in the radial direction 104, 104'. Thereby a first set of light beams 116 has a light path that extends in a direction substantially parallel with the normal axis 107 between the first light coupling surface 115 and the first reflective surface 113, 113', as illustrated in FIGS. 3 and 5. This ensures that no further internal reflections in the light guide 112 are necessary in order for the light to propagate between the first light coupling surface 115 and the first reflective surface 113, 113'. This will provide for further optimization in maintaining as much light as possible, since internal reflections may result in some loss of the available light.

The first light coupling surface 115 may be aligned substantially in parallel with the plane 103 in which the light transmissive panel 101 extends, as illustrated in e.g. FIGS. 3 and 5. Reflections in directions which are not parallel with the normal axis 107 of the plane 103 are thus minimized. As elucidated above, this is particularly advantageous when aligning the axis along which the maximum light intensity occurs, when emitted from light source 109, in the same direction, i.e. parallel with the normal axis 107. The distance between the first light coupling surface 115 and the emitter and/or detector 109' may be varied to achieve the maximum light coupling efficiency. The form of the first light coupling surface 115 may also be varied, e.g. having a convex surface for collimation of light.

Turning again to FIGS. 3 and 5, the light guide 112 may comprise a second light coupling surface 117 arranged at least partly above the touch surface 102 to direct light from the first reflective surface 113, 113', to above the touch surface. The extension of the second light coupling surface 117 along the normal axis 107 of the plane 103 may overlap at least partly with the extension the first reflective surface 113, 113', along the normal axis 107. Thereby a second set of light beams 118 has a light path that may extend in a direction substantially parallel with the radial direction 104, 104', and perpendicular to the normal axis 107, between the first reflective surface 113, 113', and the second light coupling surface 117. This ensures that no further internal reflections in the light guide 112 are necessary in order for the light to propagate between the first reflective surface 113, 113', and the second light coupling surface 117. This will provide for further optimization in maintaining as much light as possible that is diffusively reflected to above the touch surface 102. The light beams 118 propagating above the touch surface 102 will have a certain angle of spread, i.e. downwards and upwards from the surface 102, such that some light 118 will be reflected in the touch surface 102.

The second light coupling surface 117 may be aligned substantially in parallel with the normal axis 107, as illustrated in e.g. FIGS. 3 and 5. Reflections in directions which are not perpendicular with the normal axis 107 of the plane 103 are thus minimized, and it will be easier to control the characteristics of the diffusively reflected light via the angle of the first reflective surface 113, 113', only.

The light guide 112 may comprise a second reflective surface 121 intersecting the first reflective surface at an angle 127, as illustrated in FIGS. 3, 4a, 5 and 6. A first set of light beams 116' may thus be reflected by scattering between the first 113, 113', and second reflective surfaces 121, as illustrated in e.g. FIG. 4a. A greater portion of the emitted light 110 may thereby be directed to the first reflective surface 113, 113'. This enhances the efficiency of the diffusive emission from the diffusive light scattering element 114, 114', as a secondary light source. Vice versa, a greater portion of detection light 110' may be directed from the first reflective surface 113, 113', to the detector 109'.

Figure 4A:
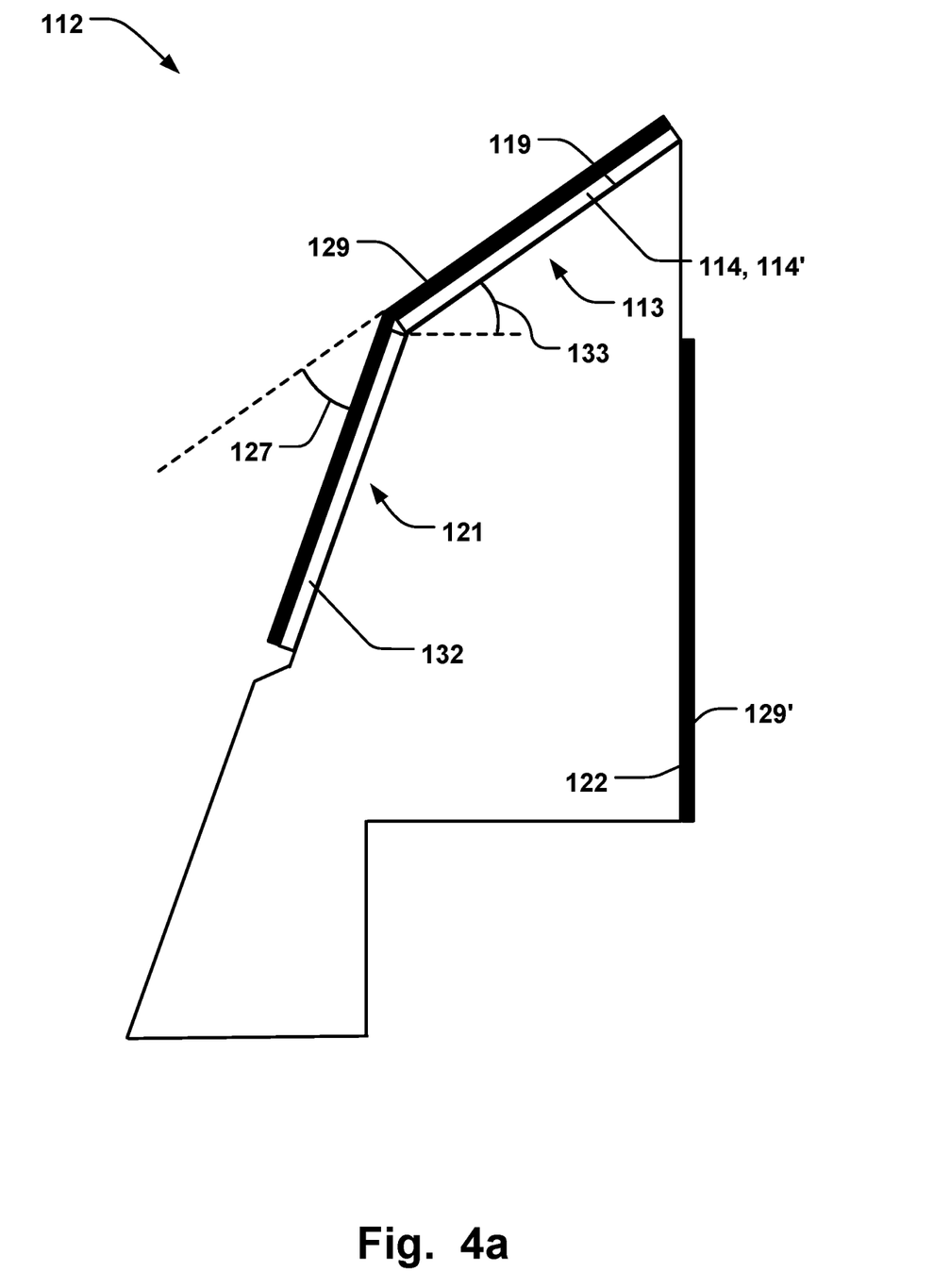
FIGS. 4a-b are schematic illustrations, in cross-sectional side views, of a detail of a light transmissive apparatus according to one example.
Figure 6:
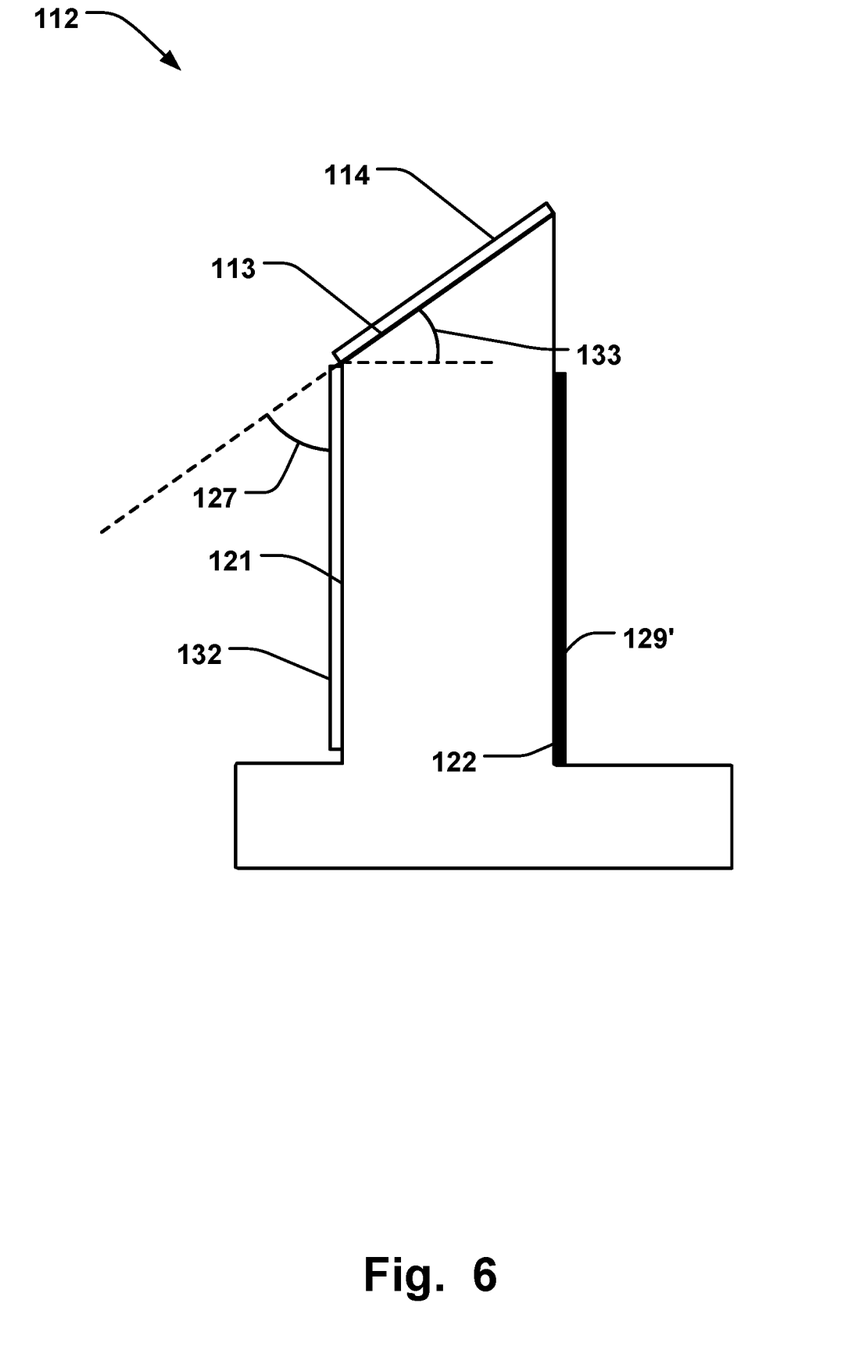
FIG. 6 is a schematic illustration, in a cross-sectional side view, of a detail of a light transmissive apparatus according to one example.

The diffusive light scattering element 114, 114', may extend along both the first 113, 113', and second 121 reflective surfaces, as illustrated with the extended diffusive light scattering element 132 in e.g. FIGS. 4a and 6. Emitted light 110 from the light source 109 that is reflected on the second reflective surface 121 will thus be diffusively scattered. A greater portion of the reflected light may in certain configurations of the touch sensing apparatus 100 then be reflected towards the first reflective surface 113. Similarly, having a diffusive light scattering element 132 at the second reflective surface 121 of a light guide 121 at a detector 109', may provide for increasing the amount of detection light 110' received from the second reflective surface 121. Alternatively, in some applications, a specularly reflective element may be provided on the second reflective surface 121, which may be particularly advantageous in the example in FIGS. 5 and 6 where the second reflective surface is substantially perpendicular with the touch surface 102. The third reflective surface 122 may in this example also be specularly reflective. Light may then be specularly reflected inside the light guide 112 until it reaches the diffusively scattering element 114.

The light guide 112 may comprise a third reflective surface 122 facing the panel sides 105, as illustrated in FIGS. 3 and 5. The third reflective surface 122 may extend along the entire thickness 128 of the light transmissive panel 101, in parallel with a normal axis 107 of a plane 103 in which the light transmissive panel extends, as further shown in FIGS. 3 and 5. Any emitted light 110 that may propagate in the light guide 112 in a direction towards the edge 105 of the panel 101 may thus be reflected either by specular reflection in a reflective coating or film or by total internal reflection on the third reflective surface 122 towards the first reflective surface 113, 113'. Detection light 110' may in a similar manner be reflected against the third reflective surface 122 towards the detector 109'.

The third 122 and second 121 reflective surfaces may be parallel, as illustrated in FIGS. 5 and 6. This may provide for an advantageous configuration in some applications, where the profile of the light guide 112 in the radial direction 104, 104', may have to be reduced, to provide a compact and robust light guide 112 while attaining highly optimized diffusively scattered light as elucidated above.

Furthermore, the third 122 and second 121 reflective surfaces may be parallel along the entire thickness 128 of the light transmissive panel 101, as in the example of FIG. 5.

Figure 7A:
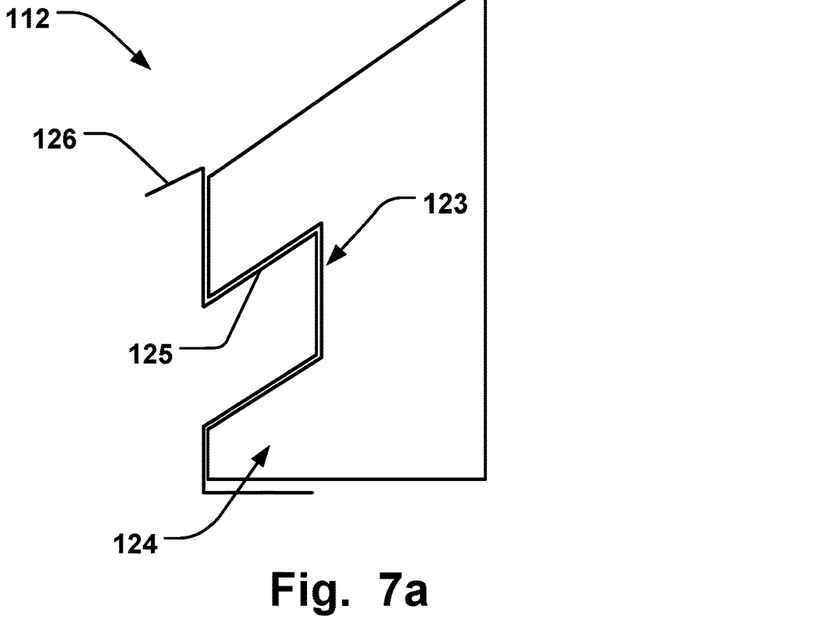
FIGS. 7a-b are schematic illustrations, in cross-sectional side views, of a detail of a light transmissive apparatus according to one example.
Figure 7B:
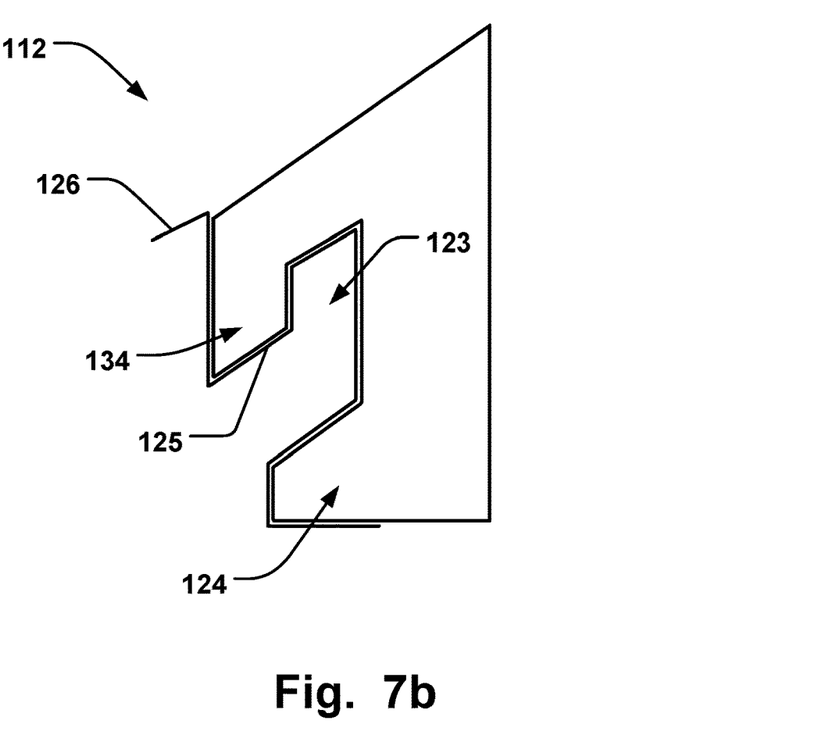

The light guide 112 may comprise a recess 123 or a protrusion 124 for interlocking with a correspondingly mating locking surface 125 of a frame element 126 of the touch sensing apparatus 100, as schematically illustrated in FIGS. 7a-b. This provides for efficiently securing the light guide 112 to the frame element 126, and thereby providing a robust touch sensing apparatus 100 and accurate alignment of the light guide 112 in relation to the emitters 109, detectors 109', and the panel 101. In FIGS. 7a-b, both recesses 123 and protrusions 124 interlock with a corresponding locking surface 125 of the frame element 126. I.e. the recess 123 of the light guide 112 receives a protruding locking surface 125 of the frame element 126, and vice versa for the protrusion 124 of the light guide 112. FIG. 7b illustrates an additional protrusion 134 extending in a direction parallel with the normal axis 107 of the plane 103, when the light guide 112 is mounted in the panel 101. This may provide for further increasing the stability of the fixation, e.g. preventing twisting of the light guide 112, while at the same time ensuring that stress on the light guide 112 is avoided.

The diffusive light scattering element 114, 114', may be configured as an essentially ideal diffuse reflector, also known as a Lambertian or near-Lambertian diffuser, which generates equal luminance from all directions in a hemisphere surrounding the diffusive light scattering element 114, 114'. Many inherently diffusing materials form a near-Lambertian diffuser. In an alternative, the diffusive light scattering element 114, 114', may be a so-called engineered diffuser, e.g. a holographic diffuser. The engineered scattering element 114, 114', may also be configured as a Lambertian diffuser. In a variant, the engineered diffuser is tailored to promote diffuse reflection into certain directions in the surrounding hemisphere, in particular to angles that provides for the desired propagation of light above and across the touch surface 102.

The diffusive light scattering element may be configured to exhibit at least 50% diffuse reflection, and preferably at least 90% diffuse reflection.

Many materials exhibit a combination of diffuse and specular reflection. Specularly reflected light may result in coupling losses between the emitter, detector and the associated component therebetween. It is thus preferred that the relation between diffusive and specular reflection is high for the diffusive light scattering element 114, 114'. It is currently believed that reasonable performance may be achieved, at least for smaller touch surfaces, when at least 50% of the reflected light is diffusively reflected. Preferably, diffusive light scattering element 114, 114', is designed to reflect incoming light such that at least about 60%, 70%, 80%, 90%, 95%, or 99% of the reflected light is diffusively reflected.

There are inherently diffusing materials that promote diffuse reflection into certain directions and that may be arranged on the first reflective surface 113, 113', to form the diffusive light scattering element 114, 114'. Thus, the diffusive light scattering element 114, 114', may comprise a material of varying refractive index.

The diffusive light scattering element 114, 114', may be implemented as a coating, layer or film applied to the first reflective surface 113, 113', e.g. by painting, spraying, lamination, gluing, etc.

The diffusive light scattering element 114, 114', may thus be arranged on an external surface 119 of the light guide 112 at the first reflective surface 113, as schematically illustrated in FIG. 4a.

In one example, the scattering element 114, 114' is implemented as matte white paint or ink applied to the first reflective surface 113, 113'. In order to achieve a high diffuse reflectivity, it may be preferable for the paint/ink to contain pigments with high refractive index. One such pigment is $TiO_2$, which has a refractive index n=2.8. It may also be desirable, e.g. to reduce Fresnel losses, for the refractive index of the paint filler and/or the paint vehicle to match the refractive index of the surface material in the external surface 119. The properties of the paint may be further improved by use of EVOQUE™ Pre-Composite Polymer Technology provided by the Dow Chemical Company.

There are many other coating materials for use as a diffuser that are commercially available, e.g. the fluoropolymer Spectralon, polyurethane enamel, barium-sulphate-based paints or solutions, granular PTFE, microporous polyester, GORE® Diffuse Reflector Product, Makrofol® polycarbonate films provided by the company Bayer AG, etc.

Alternatively, the diffusive light scattering element 114, 114', may be implemented as a flat or sheet-like device, e.g. the above-mentioned engineered diffuser or white paper, which is attached to the external surface 119 by an adhesive. According to other alternatives, the diffusive light scattering element 114, 114', may be implemented as a semi-randomized (non-periodic) micro-structure on the external surface 119 with an overlying coating of reflective material.

Figure 4B:
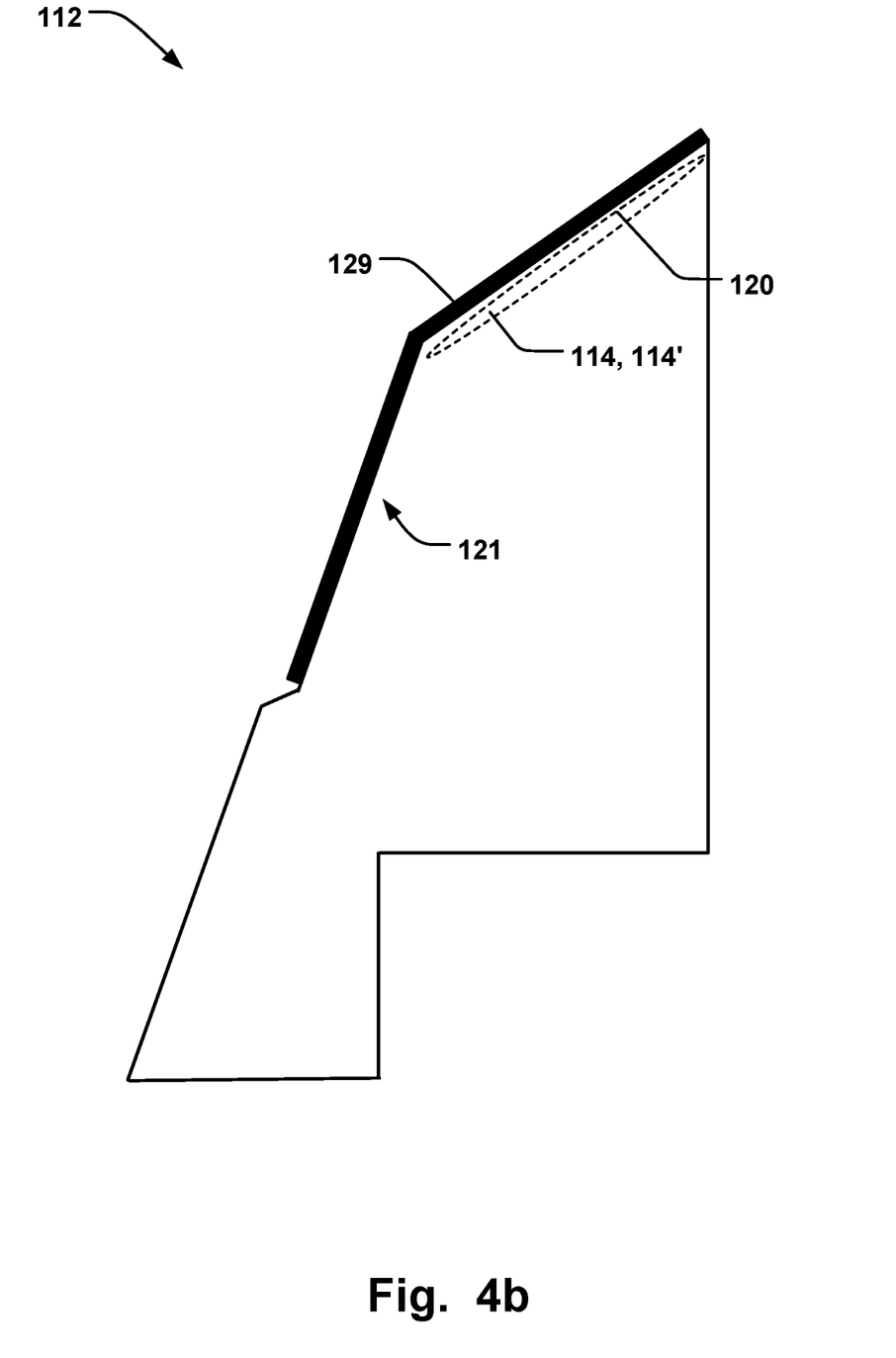

The diffusive light scattering element 114, 114', may also be incorporated into an internal surface 120 of the light guide 112 at the first reflective surface 113, 113', as schematically illustrated in FIG. 4b. For example, a microstructure may be provided on the external or internal surfaces 119, 120, by etching, embossing, molding, abrasive blasting, etc. The diffusive light scattering element 114, 114', may comprise pockets of air along the internal surface 120, that may be formed during a molding procedure of the light guide 112. It may also be possible to incorporate a film of diffusive properties into the internal surface 120 when forming the light guide 112. In another alternative, the diffusive light scattering element 114, 114', may be light transmissive (e.g. a light transmissive diffusing material or a light transmissive engineered diffuser) and covered with a coating of reflective material.

Thus, the diffusive light scattering element 114, 114', may comprise one of; white- or colored paint, white- or colored paper, Spectralon, a light transmissive diffusing material covered by a reflective material, diffusive polymer or metal, an engineered diffuser, a reflective semi-random micro-structure, in-molded air pockets or film of diffusive material.

The touch sensing apparatus may further comprise a shielding layer 129 which is applied onto the diffusive light scattering element 114, 114', as schematically illustrated in FIGS. 4a-b. The shielding layer 129 may define an opaque frame around the perimeter 108 of the light transmissive panel 102. The shielding layer 129 may increase the efficiency in providing the diffusively reflected light in the desired direction, e.g. by recycling the portion of the light that is diffusively reflected by the diffusive light scattering element 114, 114', in a direction away from the panel 101. Similarly, providing a shielding layer 129 on the light guide 112 arranged at a detector 109' reduce the amount of stray light and ambient light that reaches the detector 109'. The shielding layer 129 may have the additional function of blocking entry of ambient light through the light guide 112. Also, the third reflective surface 122 may be provided by a shielding layer 129', as illustrated in FIGS. 4a and 6. This is advantageous e.g. when it is desired to have a gasket between the panel 101 and the light guide 112, that otherwise would absorb the reflected light.

The panel 101 may be made of any solid material (or combination of materials) that transmits a sufficient amount of light in the relevant wavelength range to permit a sensible measurement of transmitted energy. Such material includes glass, poly(methyl methacrylate) (PMMA) and polycarbonates (PC). The panel 101 may be designed to be overlaid on or integrated into a display device or monitor (not shown).

The light guide 112 may be made from dark colored pmma resin. This allows the light guide to function as a daylight filter, only allowing NIR light to pass. Other possible materials are Acryrex or Acrypet.

As used herein, the emitters 109 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 109 may also be formed by the end of an optical fiber. The emitters 109 may generate light in any wavelength range. The following examples presume that the light is generated in the infrared (IR), i.e. at wavelengths above about 750 nm. Analogously, the detectors 109' may be any device capable of converting light (in the same wavelength range) into an electrical signal, such as a photo-detector, a CCD device, a CMOS device, etc.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the specific arrangement of emitters and detectors as illustrated and discussed in the foregoing is merely given as an example. The inventive coupling structure is useful in any touch-sensing system that operates by transmitting light, generated by a number of emitters, inside a light transmissive panel and detecting, at a number of detectors, a change in the received light caused by an interaction with the transmitted light at the point of touch.

The invention claimed is:
1. A touch sensing apparatus, comprising:
a light transmissive panel that defines a touch surface, an opposite rear surface, and panel sides extending between the touch surface and rear surface, the panel sides defining a perimeter of the light transmissive panel,
a plurality of light emitters and detectors arranged along the perimeter and adjacent the panel sides, a light guide arranged along the perimeter and having:
- a first reflective surface comprising a first diffusive light scattering element, and
- a second reflective surface at an angle from the first reflective surface such that light can be reflected from one surface to the other surface, and comprising a second diffusive light scattering element, wherein the light emitters are arranged to emit at least a portion of a respective beam of light onto the first diffusive light scattering element and second diffusive light scattering element so as to generate propagating light that diffusively propagates above the touch surface, wherein the light detectors are arranged to receive detection light generated as said propagating light impinges on the first diffusive light scattering element or second diffusive light scattering element, and wherein the first diffusive light scattering element is arranged at least partly outside the panel sides and extending at least partly above the touch surface.

2. Touch sensing apparatus according to claim 1, wherein the light emitters and/or the light detectors are arranged outside the panel sides.

3. Touch sensing apparatus according to claim 1, wherein the light emitters and/or the light detectors are aligned opposite the first reflective surface.

4. Touch sensing apparatus according to claim 1, wherein the light guide comprises a first light coupling surface facing the light emitters and/or the light detectors, wherein the extension of the first light coupling surface in a radial direction, perpendicular to a normal axis of a plane in which the light transmissive panel extends, overlaps at least partly with the extension the first reflective surface in the radial direction, whereby a first set of light beams has a light path extending in a direction parallel with the normal axis between the first light coupling surface and the first reflective surface.

5. Touch sensing apparatus according to claim 4, wherein the first light coupling surface is aligned substantially in parallel with the plane in which the light transmissive panel extends.

6. Touch sensing apparatus according to claim 1, wherein the light guide comprises a second light coupling surface arranged at least partly above the touch surface to direct light from the first reflective surface to above the touch surface, wherein the extension of the second light coupling surface along a normal axis of a plane in which the light transmissive panel extends overlaps at least partly with the extension of the first reflective surface along the normal axis, whereby a second set of light beams has a light path extending in a direction parallel with a radial direction, perpendicular to the normal axis, between the first reflective surface and the second light coupling surface.

7. Touch sensing apparatus according to claim 6, wherein the second light coupling surface is aligned substantially in parallel with the normal axis.

8. Touch sensing apparatus according to claim 1, wherein the first diffusive light scattering element and/or second diffusive light scattering element comprises a material of varying refractive index.

9. Touch sensing apparatus according to claim 8, wherein the first diffusive light scattering element and/or second diffusive light scattering element is arranged on an external surface of the light guide at the first reflective surface.

10. Touch sensing apparatus according to claim 8, wherein the first diffusive light scattering element and/or second diffusive light scattering element is incorporated into an internal surface of the light guide at the first reflective surface.

11. Touch sensing apparatus according to claim 1, wherein the light guide comprises a second reflective surface intersecting the first reflective surface at an angle, whereby a first set of light beams are reflected between said first and second reflective surfaces.

12. Touch sensing apparatus according to claim 11, wherein said first diffusive light scattering element extends along both the first and second reflective surfaces.

13. Touch sensing apparatus according to claim 1, wherein the light guide comprises a third reflective surface facing the panel sides and extending along an entire thickness of the light transmissive panel, in parallel with a normal axis of a plane in which the light transmissive panel extends.

14. Touch sensing apparatus according to claim 11, wherein the third and second reflective surfaces are parallel.

15. Touch sensing apparatus according to claim 14, wherein the third and second reflective surfaces parallel along the entire thickness of the light transmissive panel.

16. Touch sensing apparatus according to claim 1, wherein the light guide comprises a recess or a protrusion for interlocking with a correspondingly mating locking surface of a frame element of the touch sensing apparatus.

17. Touch sensing apparatus according to claim 1, wherein the first diffusive light scattering element and/or second diffusive light scattering element is an essentially Lambertian diffuser.

18. Touch sensing apparatus according to claim 1, wherein the first diffusive light scattering element and/or second diffusive light scattering element is configured to exhibit at least 50% diffuse reflection, and preferably at least 90% diffuse reflection.

19. Touch sensing apparatus according to claim 1, wherein the first diffusive light scattering element and/or second diffusive light scattering element comprises one of; white- or colored paint, white- or colored paper, Spectralon, a light transmissive diffusing material covered by a reflective material, diffusive polymer or metal alloy, an engineered diffuser, a reflective semi-random micro-structure, in-molded air pockets or film of diffusive material.

20. Touch sensing apparatus according to claim 1, further comprising a shielding layer which is applied onto the diffusive light scattering element and which defines an opaque frame around the perimeter of the light transmissive panel.

* * * * *